US009845258B1

(12) United States Patent
Madolora et al.

(10) Patent No.: US 9,845,258 B1
(45) Date of Patent: *Dec. 19, 2017

(54) COMPOSITIONS AND METHODS FOR TREATING WASTEWATER

(71) Applicant: Premier Magnesia, LLC, West Conshohocken, PA (US)

(72) Inventors: Matthew P. Madolora, Austin, TX (US); Jerry E. Rademan, Jacksonville, FL (US); J. Peter Ahl, Kennett Square, PA (US)

(73) Assignee: Premier Magnesia, LLC, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,025

(22) Filed: Sep. 13, 2013

Related U.S. Application Data

(60) Provisional application No. 61/805,335, filed on Mar. 26, 2013, provisional application No. 61/703,011, filed on Sep. 19, 2012.

(51) Int. Cl.
| | |
|---|---|
| *C02F 1/68* | (2006.01) |
| *C02F 5/08* | (2006.01) |
| *C02F 5/10* | (2006.01) |
| *B01D 15/00* | (2006.01) |
| *C02F 1/42* | (2006.01) |
| *C02F 1/00* | (2006.01) |
| *C02F 1/66* | (2006.01) |

(52) U.S. Cl.
CPC ............... *C02F 5/08* (2013.01); *C02F 1/683* (2013.01); *C02F 5/083* (2013.01); *C02F 5/10* (2013.01); *C02F 1/66* (2013.01); *C02F 2303/02* (2013.01); *C02F 2303/22* (2013.01); *C02F 2307/08* (2013.01)

(58) Field of Classification Search
None
See application file for complete search history.

(56) References Cited

U.S. PATENT DOCUMENTS

| 4,457,847 A | 7/1984 | Lorene et al. |
| 4,952,324 A * | 8/1990 | McDonald et al. .......... 210/697 |
| 4,963,631 A | 10/1990 | Randell |

(Continued)

FOREIGN PATENT DOCUMENTS

WO    WO 2011151397 A1 * 12/2011 ............ C02F 1/5236

OTHER PUBLICATIONS

Premier Chemicals, Product Data MagOx 93 HR 325, 1999, p. 1.*

(Continued)

*Primary Examiner* — Clare M Perrin
(74) *Attorney, Agent, or Firm* — Jeffrey T. Placker; Holland & Knight LLP

(57) ABSTRACT

Compositions and methods and systems for treating wastewater within a wastewater treatment system of described. In an embodiment, a method for treating wastewater may include adding a magnesium compound to wastewater within a wastewater treatment system. The method may also include adding an effective amount of a dispersing agent and one or more of a free magnesium control agent and a seed material to wastewater within the wastewater treatment system to control the formation of struvite scale within the wastewater treatment system. Other compositions and methods are described.

22 Claims, 1 Drawing Sheet

(56) References Cited

U.S. PATENT DOCUMENTS

| | | | |
|---|---|---|---|
| 5,034,155 A * | 7/1991 | Soeder et al. | 252/389.23 |
| 5,264,018 A | 11/1993 | Koenigsberg et al. | |
| 5,352,365 A * | 10/1994 | Fuller | C02F 5/14 |
| | | | 134/22.14 |
| 5,833,864 A * | 11/1998 | Miller et al. | 210/724 |
| 5,858,244 A * | 1/1999 | Tang et al. | 210/698 |
| 5,942,207 A * | 8/1999 | Moini et al. | 423/700 |
| 6,355,214 B1 | 3/2002 | Fader et al. | |
| 6,391,207 B1 * | 5/2002 | Cluyse | 210/700 |
| 6,555,012 B1 * | 4/2003 | Fernholz et al. | 210/749 |
| 7,005,072 B2 * | 2/2006 | Bowers et al. | 210/715 |
| 9,108,868 B1 | 8/2015 | Madolora et al. | |
| 2007/0039893 A1 * | 2/2007 | Kemp | B01D 53/58 |
| | | | 210/660 |
| 2008/0308505 A1 | 12/2008 | Jansen et al. | |
| 2009/0048142 A1 * | 2/2009 | Mortimer et al. | 510/475 |
| 2013/0068695 A1 | 3/2013 | Wardle et al. | |
| 2013/0200301 A1 * | 8/2013 | Cornel | C02F 1/5236 |
| | | | 252/182.29 |
| 2013/0264290 A1 | 10/2013 | Madolora | |

OTHER PUBLICATIONS

Premier Chemicals, "Product Data MagOx 93 HR 325", Jan. 15, 1999, Total pp. 1.*
Non-Final Office Action issued in related U.S. Appl. No. 14/026,080, dated Jul. 29, 2016.
Non-Final Office Action issued in related U.S. Appl. No. 14/206,105 dated Mar. 2, 2016.
Final Office Action Issued in related U.S. Appl. No. 14/026,105 dated Dec. 5, 2016.
Non-Final Office Action issued in related U.S. Appl. No. 14/026,105 dated Sep. 15, 2017.
Final Office Action issued in related U.S. Appl. No. 14/026,080 dated Oct. 23, 2017.

* cited by examiner

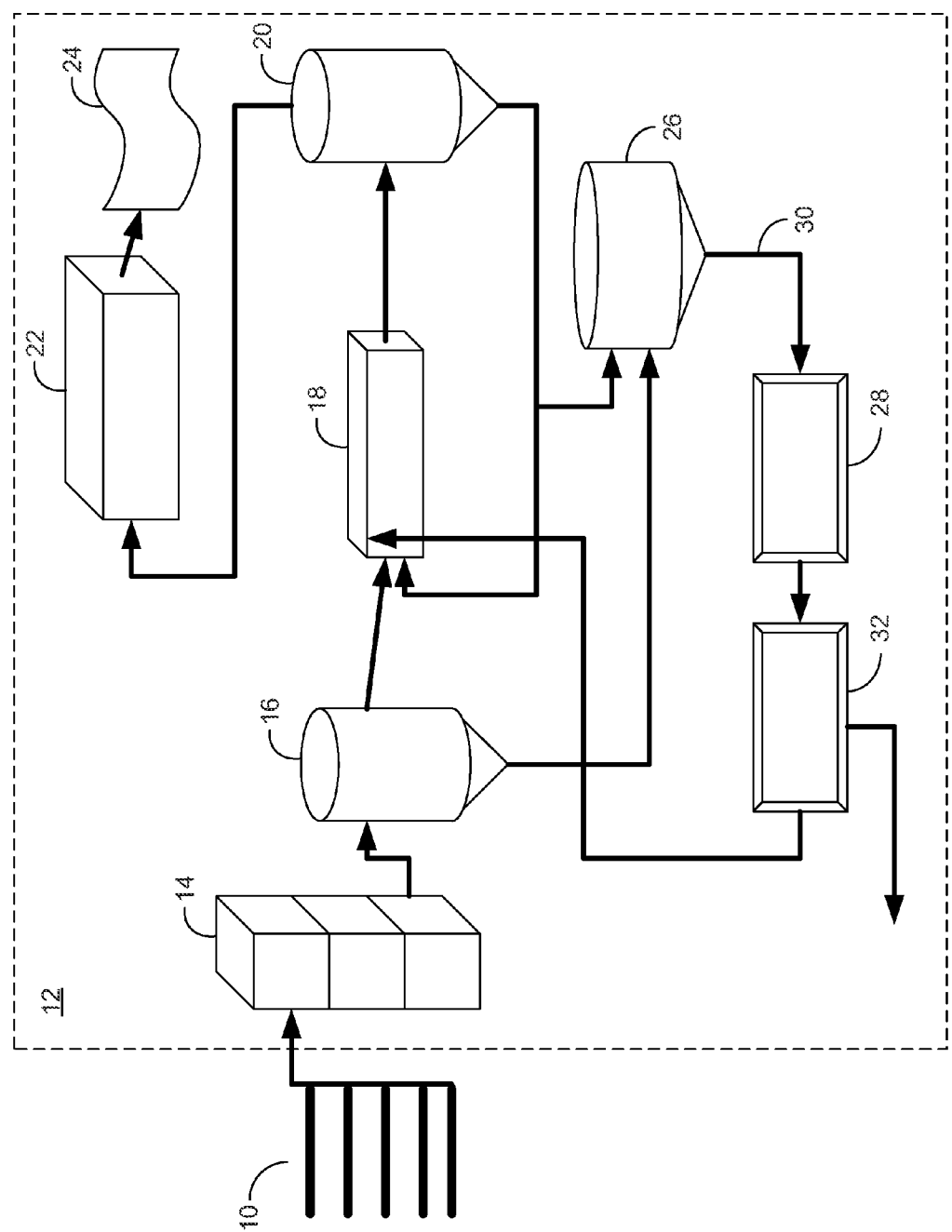

COMPOSITIONS AND METHODS FOR TREATING WASTEWATER

CROSS-REFERENCE TO RELATED APPLICATIONS

This application claims the benefit of U.S. provisional patent application Ser. No. 61/805,335 entitled "Reducing And Preventing Struvite Scale Formation In Waste Water Treatment Using A Magnesium Hydroxide Slurry," filed on 26 Mar. 2013, this application also claims the benefit of U.S. provisional patent application Ser. No. 61/703,011, entitled "Reducing and Preventing Struvite Scale Formation in a Waste Water Treatment Using a Magnesium Hydroxide Slurry," filed on 19 Sep. 2012, the entire disclosures of which is incorporated herein by reference.

TECHNICAL FIELD

The present disclosure generally relates to compositions and methods for treating wastewater, and more particularly to compositions and methods for reducing and/or preventing the formation of struvite scale within wastewater treatment systems.

BACKGROUND

Wastewater treatment systems, such as municipal and commercial wastewater treatment systems may provide for the treatment of wastewater from residential, commercial, or other uses. Wastewater treatment systems may variously include wastewater collection systems and/or wastewater treatment facilities. Generally, a wastewater collection system may receive wastewater from a point of use, such as a residential home, a business, and/or commercial facility and may transport the wastewater to a wastewater treatment facility. The collected wastewater may be transported using any combination of gravity conveyance and pumping to transport the wastewater from various collection points to, and even through, a wastewater treatment facility. Generally, a wastewater treatment facility may include one, or a variety, of treatment processes that may, for example, separate solid materials, biomaterials, and the like from the water and/or may perform other processes that may render the processed wastewater suitable to rejoin the environment, such as an environmental water supply, like a river or lake, or an environment land-based return.

The operation and efficiency of a wastewater treatment system may be influenced by a variety of factors, including factors that may impact the ability to collect and/or transport the wastewater, may impact the ability to carry out wastewater treatment processes, and/or impact the service and/or maintenance requirements and time of wastewater collection and/or processing systems and equipment. Factors that may impede the transport of wastewater throughout the system, decrease the efficiency of treatment processes, and/or increase service or maintenance requirements of the wastewater treatment system may increase the operating cost of the wastewater treatment system. For example, a decrease in efficiency may result in increased energy costs to operate the wastewater treatment system and/or a decreased throughput of the wastewater treatment system. An increase in the required service and maintenance may result from expenditures in equipment repair and replacement and the number of maintenance man-hours that may be required to keep the wastewater treatment system operating at an acceptable level.

SUMMARY

According to an implementation a method for treating wastewater may include adding a magnesium compound to wastewater within a wastewater treatment system. The method may also include adding an effective amount of a dispersing agent and one or more of a free magnesium control agent and a seed material to wastewater within the wastewater treatment system to control the formation of struvite scale within the wastewater treatment system.

One or more of the following features may be included. The method may include measuring struvite scale formation within the wastewater treatment system. The method may also include adjusting a concentration of one or more of the dispersing agent and the one or more of the free magnesium control agent and the seed material to reduce the struvite scale formation within the wastewater treatment system.

Adding the magnesium compound, and adding the effective amount of the dispersing agent and the one or more of the free magnesium control agent and the seed material may include adding an admixture including the magnesium compound, and the effective amount of the dispersing agent, and the one or more of the free magnesium control agent and the seed material to wastewater within the wastewater treatment system. The method may include adding the magnesium compound to wastewater at a first location within the wastewater treatment system. The method may also include adding the effective amount of the dispersing agent, and the one or more of the free magnesium control agent and the seed material to wastewater at a second location within the wastewater treatment system different from the first location. The method may include adding one or more of the magnesium compound and the effective amount of the dispersing agent and one or more of the free magnesium control agent and the seed material to wastewater within a wastewater collection system. The method may include adding one or more of the magnesium compound and the effective amount of the dispersing agent and one or more of the free magnesium control agent and the seed material to wastewater within a wastewater treatment process.

The magnesium compound may include one or more of magnesium oxide and magnesium hydroxide. The magnesium hydroxide may exhibit an alkaline hydroxide purity of between about 85% to about 100%. The magnesium hydroxide may also exhibit a caustic magnesia activity of between about 50 seconds to about 1440 minutes. The magnesium hydroxide may also exhibit a particle size of between about 0.1 micron to about 50 microns. The magnesium hydroxide may also exhibit a specific surface area of between about 9 $m^2/g$ to about 200 $m^2/g$. The magnesium hydroxide may further exhibit a stabilized residuals test value of between about 1 milligram to about 50 grams. The magnesium oxide may exhibit an alkaline magnesium oxide purity of between about 85% to about 100%. The magnesium oxide may also exhibit a caustic magnesia activity of between about 50 seconds to about 1000 seconds. The magnesium oxide may also exhibit a particle size of between about 0.1 micron to about 30 microns. The magnesium oxide may further exhibit a specific surface area of between about 9 $m^2/g$ to about 300 $m^2/g$.

The dispersing agent may include one or more of a polyacrylate, a polyamide, a polyacrylamide, a polyphosphate, a polyethylene glycol ester, an ethoxylated alkyl phenol, an ethoxylated polyhydric alcohol, an ethoxylated polyhydric ether, and an ethoxylated polyhydric ester. The effective amount of the dispersing agent may include between about 0.01% to about 90% of the dispersing agent relative to the weight of the magnesium compound. The admixture may include a slurry including between about 0.01% to about 50% of the dispersing agent by weight of the slurry.

The free magnesium control agent may include one or more of a salt of a polyamine acetic acid, an acid of a polyamine acetic acid, an oxylate, a polyphosphonic acid, a polyphosphate, a gluconate, a carboxylate polymer, an a polyaspartic acid. The effective amount of the free magnesium control agent may include between about 0.01% to about 90% of the free magnesium control agent relative to the weight of the magnesium compound. The admixture may include a slurry including between about 0.01% to about 50% of the free magnesium control agent by weight of the slurry.

The seed material may include one or more of struvite seeds, a micro-silica, aluminum, iron, titanium, tin, copper, molybdenum, manganese, lanthanum, selenium, zeolites, clay, and volcanic ash. The seed material may include a combination of micro-silica and aluminum. The seed material may include particles having a length of between about 0.2 microns to about 1.0 millimeters. The effective amount of the seed material may include between about 0.01% to about 90% of the seed material relative to the weight of the magnesium compound. The admixture may include a slurry including between about 0.01% to about 50% of the seed material includes by weight of the slurry.

The method may further include adding a scale reducer to wastewater within the wastewater treatment system. The scale reducer may include one or more of ascorbic acid, citric acid, acetic acid, and an organic derivative of one or more of ascorbic acid, citric acid, acetic acid, and an alkyl amine acetic acid. Adding the magnesium compound and adding the effective amount of the dispersing agent and one or more of the free magnesium control agent and the seed material to wastewater within the wastewater treatment system may include adding a slurry including the magnesium compound, the dispersing agent and one or more of the free magnesium control agent and the seed material, in which the slurry may include between about 0.01% to about 50% of the scale reducer by weight of the slurry.

The details of one or more implementations are set forth in the accompanying drawings and the description below. Other features and advantages will become apparent from the description, the drawings, and the claims.

BRIEF DESCRIPTION OF THE DRAWINGS

FIG. 1 schematically depicts an example embodiment of a wastewater treatment system.

DETAILED DESCRIPTION OF EXAMPLE EMBODIMENTS

According to some implementations consistent with the present disclosure compositions and methods for utilizing magnesium compounds in connection with various wastewater treatment processes and/or systems may be provided while reducing or eliminating the occurrence of struvite accumulation. For example, according to an embodiment, a method for treating wastewater may include adding a magnesium compound to wastewater within a wastewater treatment system.

In various embodiments, magnesium compounds may be utilized in connection with wastewater treatment systems to improve the operation and/or efficiency of the wastewater treatment system, for example, by improving wastewater collection and/or transport, improving one or more wastewater treatment processes, and/or by reducing necessary service or maintenance of the wastewater treatment system. In some embodiments, the magnesium compound may include one or more of magnesium hydroxide, magnesium oxide, and/or magnesium hydroxide and/or magnesium oxide bearing compound.

For example, a magnesium hydroxide and/or magnesium oxide compound may be added to wastewater within a wastewater treatment system to provide odor control within at least a portion of the wastewater treatment system, thereby reducing or eliminating nuisance odors associated with the wastewater treatment system. Further, in some embodiments, a magnesium compound, such as magnesium hydroxide and/or magnesium oxide, may be added to wastewater within a wastewater treatment system to reduce and/or control corrosion within the wastewater treatment system. For example, the magnesium compound may be utilized to control and/or reduce corrosion of pumping equipment (such as pump vanes and/or pump housings) transport equipment (such as pipes, valves, valve bodies, debris grates, etc.), and/or processing equipment associated with the wastewater treatment system.

Magnesium compounds may also be added to wastewater within a wastewater treatment system to provide an alkalinity source. For example, various biological processes, such as the biological reduction of ammonia (e.g., nitrification) may produce various acids, such as nitric acid, nitrous acid, and carbonic acid. Magnesium compounds (e.g., magnesium hydroxide and/or magnesium oxide) may be added to wastewater within the wastewater treatment system as source of alkalinity to stabilize the pH of the process. Similarly, magnesium compounds may be utilized in various biological treatment processes within a wastewater treatment system. For example, anaerobic digestion processes may generate acid. Magnesium compounds may be added to wastewater within a biological digestion process, and/or downstream from a biological digestion process, as an alkaline source, which may improve the performance of the process, and/or mitigate effects associated with the acid production by the biological digestion process.

Magnesium compounds may also be added to wastewater within a wastewater treatment system to decrease and/or prevent the accumulation of fat, oil, and grease (e.g., "FOG") within the wastewater treatment system, and/or to remove or decrease any FOG occlusions within at least a portion of the wastewater treatment system. FOG occlusions and/or accumulations within a wastewater treatment system (e.g., within conveyance pipes, pumps, valves, etc.,) may impede the flow of wastewater through at least a portion of the wastewater treatment system, and may, thereby, reduce the efficiency of the wastewater treatment system. In some embodiments, adding magnesium compounds to wastewater within a wastewater treatment system may reduce and/or eliminate FOG occlusions and/or accumulation.

In some embodiments, magnesium compounds may be added to wastewater within a wastewater treatment system to eliminate, reduce, and/or control the accumulation of gasses within wastewater and/or to eliminate, reduce, and/or control the emission of gasses from the wastewater. For example, wastewater within wastewater treatment systems may accumulate air and gasses, such as $N_2$, $H_2S$, $NH_3$, $CO_2$, $NO_x$, $O_2$, and the like. Gas accumulation within wastewater may result from pumping and transport of the wastewater, biological processes occurring within the wastewater treatment system (e.g., biological consumption and/or decomposition of materials within the wastewater treatment system, etc.). Gas accumulation within and/or emission from the wastewater treatment system may, for example, reduce operational efficiency of the wastewater treatment system by creating backpressure within wastewater transport lines which must be overcome by upstream pumping equipment, by creating suction head and/or cavitation within pumping systems, or the like. Further, gas accumulation and/or emission may give rise to nuisance odors resulting from gas release around human populations, or the like. In some embodiments, magnesium compounds may be added to wastewater within a wastewater treatment system to prevent, control, and/or reduce the accumulation and/or emission of gases within wastewater, for example, by facilitating one or more biological consumption processes and/or decomposition processes, by preventing one or more biological consumption processes and/or decomposition processes and/or through various additional and/or alternative mechanisms.

As will be appreciated, and as discussed herein, magnesium compounds, such as magnesium hydroxide and/or magnesium oxide, may be added to wastewater within a wastewater treatment system to achieve various described and/or additional or alternative objectives. Further, it will be appreciated that magnesium compounds may be added to wastewater within a wastewater treatment system to achieve more than one objective and/or to influence more than one process and/or interaction occurring within a wastewater treatment system. Accordingly, it will be understood that any discussion regarding the addition of magnesium compounds to wastewater within a wastewater treatment system is intended for illustrative purposes, and should not be construed as limiting the present disclosure. Further, some particular uses of magnesium compounds within wastewater treatment systems are described, for example, in U.S. patent application Ser. No. 13/853,465, entitled "Improving Wastewater Pumping and Conveying Efficiency," filed 29 Mar. 2013, which claims the benefit of U.S. provisional patent application Ser. No. 61/618,336, filed on 30 Mar. 2012, the entire disclosure of both of which are incorporated herein by reference. Similarly, some particular uses of magnesium compounds within wastewater treatment systems are also described in U.S. patent application Ser. No. 13/613,963, entitled "Methods and Compositions for the Prevention of Struvite Scale Formation in Wastewater Systems," filed 13 Sep. 2012, which claims the benefit of U.S. provisional patent application Ser. No. 61/535,706, filed on 16 Sep. 2011, the entire disclosure of both of which are also incorporated herein by reference. Some particular example uses of magnesium compounds within wastewater treatment systems are also described in U.S. Pat. No. 5,833,864, entitled "Method for the Reduction and Control of the Release of Gas and Odors from Sewage and Waste Water," issued on 10 Nov. 1998, the entire disclosure of which is incorporated herein by reference.

The concentration of the magnesium compound added to the wastewater treatment system may vary, for example, based on an intended objective for the magnesium compound. For example, as generally discussed above, magnesium compounds may be added to wastewater within a wastewater treatment system to reduce corrosion of pumping equipment, conveyance equipment, processing equipment or the like. Similarly, magnesium compounds may be added to wastewater within a wastewater treatment system to facilitate treatment processes (e.g., biological processing of organic materials, etc.) and/or control or mitigate by-products of treatment processes (e.g., to increase the alkalinity and/or pH of treated wastewater, etc.). Further, magnesium compounds may be utilized to reduce and/or prevent the accumulation of FOG within a wastewater treatment system and/or reduce or prevent the accumulation of gasses within wastewater. Magnesium compounds may be added to wastewater to achieve and/or facilitate various additional/alternative objectives within a wastewater treatment system. Accordingly, it will be appreciated that the magnesium compound may be added to wastewater within the wastewater treatment system at various concentrations depending upon the condition of the wastewater (e.g., pH, alkalinity, organic material content, etc.), an intended objective (increasing alkalinity, increasing pH, facilitating a treatment process, reducing FOG and/or gas entrainment, etc.) giving rise to the addition of the magnesium compound to the wastewater, a magnitude of change or impact that may be desired, as well as various additional and/or alternative criteria.

In some embodiments, magnesium compounds may be added to wastewater within a wastewater treatment system to achieve a concentration of between about 0.5 mg/L to about 10,000 mg/L in the wastewater. For example, in some embodiments, magnesium compounds may be added to wastewater within a wastewater treatment system at a rate of between about 5 mg/L to about 4,000 mg/L. In some embodiments, magnesium compounds may be added to wastewater within a wastewater treatment system at a rate of between about 5 mg/L to about 1000 mg/L. For example, in an experiment embodiment, an effective concentration of a magnesium compound for reducing FOG and gas accumulation was in the range of between about 40 mg/L to about 105 mg/L. As discussed above, depending upon an intended usage and a condition of the wastewater, various concentrations of magnesium compounds may be utilized. Accordingly, the forgoing example concentration ranges should be understood as being for the purpose of illustration, and not of limitation.

As discussed above, in some embodiments, the magnesium compound may include magnesium hydroxide and/or magnesium oxide. Magnesium hydroxide may be added to wastewater within a wastewater treatment system as either a dry powder or as a slurry, e.g., which may include magnesium hydroxide and/or magnesium oxide solids in water. In an illustrative embodiment, magnesium hydroxide may be added to wastewater within a wastewater treatment system as a slurry including between about 30% to about 90% magnesium hydroxide solids in water. In one particular embodiment, magnesium hydroxide may be added to wastewater within a wastewater treatment system as a slurry containing about 60% magnesium hydroxide solids in water. Magnesium hydroxide slurries including various additional/alternative solids content may suitably be utilized. Further, magnesium oxide may be added to wastewater within a wastewater treatment system as a dry powder. Magnesium compounds may also be added to wastewater including combinations of magnesium hydroxide and magnesium oxide.

Magnesium oxide and/or magnesium hydroxide may be provided as various naturally occurring and/or synthetically produced and/or modified products. For example, magnesium oxide may be refined from naturally occurring magnesite that has been calcined to produce grades of magnesium oxide that may often be referred to as "caustic calcined magnesia." Caustic calcined magnesia may be further hydrated to form magnesium hydroxide. Magnesium hydroxide may also originate from Brucite, which is a naturally occurring magnesium hydroxide deposit. Magnesium hydroxide from Brucite deposits may have a wide range of purity, which is often significantly lower in reactivity than caustic calcined magnesia products. Magnesium oxide and/or magnesium hydroxide can be further produced as a precipitate from brine or seawater. Such precipitated magnesium oxide and/or magnesium hydroxide may often be referred to as "synthetic magnesia," which may often be provided having reactivity characteristics that may be generally similar to caustic calcined magnesia varieties.

In some embodiments, magnesium compounds may be provided and utilized that may have characteristics which may exhibit increased suitability for application in biological, near neutral and alkaline wastewater treatment. For example, magnesium oxide and/or magnesium hydroxide compounds may be provided having particular combinations of levels of purity, levels of stability, particle size and/or particle size distribution, specific surface area characteristics, and levels of reactivity.

In an embodiment, magnesium compounds may be utilized having a relatively high degree of purity. In an example embodiment, magnesium compounds may be provided having an alkaline magnesium oxide and/or alkaline magnesium hydroxide purity of between about 85% to about 100% pure alkaline magnesium oxide and/or magnesium hydroxide. In an illustrative embodiment, a magnesium compound may be provided having an alkaline magnesium oxide and/or alkaline magnesium hydroxide purity of between about 91% to about 98% pure alkaline magnesium oxide and/or magnesium hydroxide.

In some embodiments, the stability of the magnesium hydroxide may be generally related to the ability of a magnesium hydroxide slurry to maintain pumpability while minimizing solids residue that may accumulate in a storage and/or transportation tank (e.g., rail tank, tanker truck, etc.), which may become difficult to re-suspend. Accordingly, the stability of the magnesium hydroxide may be indicative of the ability of a magnesium hydroxide slurry to withstand transportation and storage, while remaining susceptible to dispensing, as through pumping. In an example embodiment, the stability of a magnesium hydroxide slurry may be quantified using the stabilized residuals test ("SRT-Tap Test"). In general, the SRT-Tap test may assess the solids settling stability of magnesium hydroxide suspensions. According to an embodiment, an eight fluid ounce test bottle may be filled with a magnesium hydroxide slurry. The magnesium hydroxide slurry may be retained in the test bottle for a fourteen hour period, with the test bottle maintained in an upright position. After fourteen hours, sediment collecting in the bottom of the test bottle (e.g., as a result of magnesium hydroxide falling out of suspension) may be evaluated. The test bottle containing the slurry and/or any collected sediment may be vigorously shaken in a horizontal orientation of the test bottle for fifteen seconds, and the slurry may then be poured out of the test bottle. The test bottle may subsequently be filled with approximately an inch and a half of water, which may be swirled within the bottle to remove slurry film from the side of the bottle. The water may be poured from the test bottle and the test bottle may be inverted to drain for fifteen minutes. A difference between the post draining weight of the test bottle and an initial weight (e.g., prior to initially filling the test bottle with magnesium hydroxide slurry) may be determined. According to various embodiments, a suitable magnesium hydroxide may provide an SRT-Tap test value of between about 1 milligram and about 50 gram. In some embodiments, a suitable magnesium hydroxide may provide an SRT-Tap test value of between about 0.1 gram to about 50 gram. In an embodiment, a suitable magnesium hydroxide may provide an SRT-Tap test value of between about 1 gram to about 50 gram. In an example embodiment, a suitable magnesium hydroxide may provide an SRT-Tap Test value of between about 1 gram and about 20 gram. In a particular embodiment, a suitable magnesium hydroxide may provide an SRT-TAP Test value of between about 1 gram and about 20 grams, with an average value of about 10 grams.

In some embodiments, a magnesium compound may include magnesium hydroxide exhibiting a caustic magnesia activity ("CMA") neutralization time of between about 50 seconds to about 1440 minutes using 1.0N acetic acid and a magnesium hydroxide content of between about 10% to about 100%. In some embodiments, a magnesium compound may include magnesium oxide exhibiting a caustic magnesia activity neutralization time of between about 50 seconds to about 1000 seconds using 1.0N acetic acid and a magnesium oxide content of between about 10% to about 100%. In an embodiment, the magnesium compound may be provided exhibiting a caustic magnesia activity neutralization time of between about 50 seconds to about 200 seconds using a 1.0N acetic acid and a magnesium oxide and/or magnesium hydroxide content of between about 10% to about 100%. In a particular example embodiment, the magnesium compound may be provided exhibiting a caustic magnesia activity neutralization time of about 125 seconds using a 1.0N acetic acid and a magnesium oxide and/or magnesium hydroxide content of between about 10% to about 100%.

In an embodiment, the magnesium compound may be provided having a particle size that may provide an enhanced specific surface area ("SSA"). For example, generally, a magnesium compound having a smaller particle size may enhance the overall specific surface area of the magnesium compound (e.g., which may include magnesium oxide and/or magnesium hydroxide). In an embodiment, a magnesium compound may include a magnesium hydroxide exhibiting a particle size of between about 0.1 micron to about 50 micron. In some embodiments, a magnesium compound may include magnesium oxide exhibiting a particle size of between about 0.1 micron to about 30 micron. For example, in an embodiment, the magnesium compound may include a magnesium oxide and/or magnesium hydroxide having a particle size of between about 1 micron to about 20 microns. In one illustrative embodiment, the magnesium compound may include a magnesium oxide and/or magnesium hydroxide having an average particle size of about 10 micron.

In addition to the average particle size, the magnesium compound may be provided having a particle size distribution that may improve the stability of a slurry produced using the magnesium compound. As generally discussed above, a higher degree of stability of a slurry produced using the magnesium compound may generally relate to the ability to maintain pumpability of the slurry while minimizing solids residue that may accumulate in a storage and/or transportation tank. In some situations, a relatively more narrow particle size distribution of the magnesium compound may increase the stability of a slurry produced using the magnesium compound. In an embodiment, particle size and particle size distribution may be measured and/or controlled using screen analysis and a particle size distribution analyzer.

In an embodiment, a magnesium compound may be provided having a desired reactivity. A magnesium compound having a relatively higher reactivity may provide more complete and efficient use within a desired application, and may, in some instances, at least partially offset a relatively low solubility that may be associated with magnesium compounds such as magnesium oxide and/or magnesium hydroxide. For example, a relatively higher reactivity may more efficiently facilitate biological processes, increases in wastewater alkalinity, prevention and/or reduction of FOG and/or entrained gasses, etc., which may allow lower concentrations and/or amounts of magnesium compounds to be effectively utilized. In an embodiment, specific surface area ("SSA") of the magnesium compound may be correlated to reactivity, e.g., in which a relatively higher specific surface area may be correlated to a relatively higher reactivity. In some embodiments, a magnesium compound may include magnesium hydroxide exhibiting a specific surface area of between about 9 $m^2$/g to about 200 $m^2$/g. For example, in an example embodiment, a magnesium compound may include magnesium hydroxide having a specific surface area in the range of between about 9 $m^2$/gram to about 50 $m^2$/gram. In one particular embodiment, a magnesium hydroxide may include a specific surface area of about 12 $m^2$/gram. In some embodiments, a magnesium compound may include magnesium oxide exhibiting a specific surface area of between about 9 m2/g to about 300 m2/g. For example, in an example embodiment, a magnesium compound may include magnesium oxide having a specific surface area in the range of between about 9 $m^2$/gram to about 150 $m^2$/gram. In a particular embodiment, a magnesium oxide may be provided having a specific surface area of about 12 $m^2$/gram.

Consistent with the foregoing, a magnesium compound may be added to wastewater within a wastewater treatment system to achieve various beneficial effects. In an illustrative embodiment, the magnesium compound may include magnesium hydroxide having the attributes detailed in Table 1 below. The magnesium hydroxide may be provided as either a powder, and/or as a premixed slurry. In an embodiment in which the magnesium hydroxide may be provided as a premixed slurry, the slurry may include between about 30% to about 90% magnesium hydroxide solids, with an average of 60% magnesium hydroxide solids, as indicated in the second row of Table 1.

TABLE 1

| Attribute | Property Avg | Property Max | Property Min |
| --- | --- | --- | --- |
| Magnesium Hydroxide Solids | 60% | 90% solids | 30% solids |
| Purity of Magnesium Hydroxide | 91-98% | 100% | 85% |
| CMA | 125 secs | 200 secs | 50 secs |
| Particle Size | 10 micron | 20 micron | 1 micron |
| Stabilized Residuals Test | 10 grams | 20 grams | 1 milligram |
| Specific Surface Area - SSA | 12 $m^2$/gram | 50 $m^2$/gram | 9 $m^2$/gram |

In an illustrative embodiment, the magnesium compound may include magnesium oxide having the attributes detailed in Table 2 below. The magnesium oxide may be provided as a powder. In some embodiments, the magnesium oxide having the attributes detailed in Table 2 may be added directly to wastewater within the wastewater treatment system (e.g., in powder form) and/or may be mixed with water to provide a slurry, which may be added to wastewater within the wastewater treatment system.

TABLE 2

| Attribute | Property Avg | Property Max | Property Min |
| --- | --- | --- | --- |
| Purity of Magnesium Oxide | 91-98% | 100% | 85% |
| Specific Surface Area - SSA | 12 $m^2$/gram | 150 $m^2$/gram | 9 $m^2$/gram |
| CMA | 125 secs | 200 secs | 50 secs |
| Particle Size | 10 micron | 20 micron | 1 micron |

Consistent with the present disclosure, various components or additives may be utilized in connection with adding magnesium compounds to wastewater within a wastewater treatment system. The components or additives may prevent and/or reduce the occurrence of struvite scale formation within at least a portion of the wastewater treatment system. For example, in an embodiment a method for treating wastewater within a wastewater treatment system may also include adding an effective amount of a dispersing agent to wastewater within the wastewater treatment system to control the formation of struvite within the wastewater treatment system. In some embodiments, a method for treating wastewater within a wastewater treatment system may also include adding an effective amount of a dispersing agent and of one or more of a free magnesium control agent and a seed material to wastewater within the wastewater treatment system to control the formation of struvite scale within the wastewater treatment system.

In general, struvite may include a mineral phosphate scale compound, and in particular, magnesium ammonium phosphate (e.g., which may also be referred to ammonium magnesium phosphate). Struvite may, for example, include a relatively soft mineral having the chemical formula $NH_4MgPO_4 \cdot 6H_2O$, although other minerals may also be generally referred to as struvites. In some circumstances, struvite may form a scale on equipment within a wastewater treatment system that may, for example, damage equipment, clog wastewater conveyance pipes, or otherwise reduce the efficiency of operation of the wastewater treatment system. For example, struvite scale may form within wastewater transfer pipes, pumps, valves, mixer blades, tank walls, or the like.

While residential wastewater streams may often contain the components of struvite (e.g., $Mg^{+2}$, $NH_4$, and $PO_4$), the concentrations of the constituents within the wastewater streams may often be insufficient to result in the precipitation of struvite from the wastewater streams and the formation of struvite scale within the wastewater treatment system. For example, in some circumstances, the availability of free magnesium (e.g., $Mg^{+2}$) may limit the formation of struvite scale within a wastewater treatment system. The addition of magnesium compounds to realize the above-discussed, and/or other, effects may increase the available free magnesium for the formation of struvite scale within the wastewater treatment system. Consistent with some embodiments, compositions and methods of the present disclosure may reduce and/or eliminate the formation and/or accumulation of struvite scale within a wastewater treatment system. Further, in some embodiments, the present disclosure may reduce and/or eliminate the formation and/or accumulation of struvite scale within a wastewater treatment system to allow for the use and/or addition of magnesium compounds within the wastewater treatment system. As used herein, a wastewater treatment system may generally refer to one or more of a wastewater collection system, a wastewater treatment facility or plant, and/or one or more individual treatment processes within a wastewater treatment facility or plant.

As discussed above, a method for treating wastewater within a wastewater treatment system may also include adding an effective amount of a dispersing agent, alone, and/or in combination with one or more of a free magnesium control agent and a seed material to wastewater within the wastewater treatment system to control the formation of struvite scale within the wastewater treatment system. According to various example embodiments, adding a dispersing agent to wastewater within a wastewater treatment system, alone, and/or in conjunction with one, or both, of a free magnesium control agent and a seed material may reduce and/or eliminate the formation of struvite scale within at least a portion of the wastewater treatment system (e.g., within at least a portion of the wastewater treatment system adjacent to, and/or downstream from, a location at which the dispersant and one, or both, of the free magnesium control agent and the seed material are added to the wastewater). It will be appreciated that while various embodiments herein may describe and/or otherwise contemplate the use, inclusion, addition, etc., of a dispersing agent and one or more of a free magnesium control agent and a seed material, further embodiments may utilize a dispersing agent without the use of one or more of a free magnesium control agent and a seed material. All such embodiments should be considered as being contemplated by this disclosure. As such, any features, implementations, and alternatives described with respect to embodiments utilizing a dispersing agent and one or more of a free magnesium control agent and a seed material should be construed as being equally applicable to embodiments utilizing a dispersing agent without one or more of a free magnesium control agent and a seed material.

As generally used herein, a wastewater treatment system may include one or more of a wastewater collection system, a wastewater treatment facility, and/or one or more individual processes or systems within a wastewater treatment facility. With reference to FIG. 1, an example wastewater treatment system is schematically depicted, including various locations and/or processes that may be subject to struvite scale formation and/or collection. As discussed above, a magnesium compound may be added to a portion of the wastewater treatment system to facilitate various processes (such as biological digestion of organic material, etc.), to mitigate undesired circumstances or conditions (e.g., the production and/or release of odors, gasses, accumulation of FOG, the occurrence of corrosion, and the like), and/or to otherwise facilitate operation and/or efficiency of a wastewater treatment system. The addition of the magnesium compound may occur upstream in the wastewater treatment system relative to a region or location at which the action of the magnesium compound is desired. Similarly, the addition of the dispersing agent and either, or both, of the free magnesium control agent and the seed material may occur upstream in the wastewater treatment system relative to a region or location at which the formation and/or collection of struvite scale may occur. Additionally a situation may occur in which the formation and/or collection of struvite scale may tend to be the result of and/or accelerated by the addition of the magnesium compound to the wastewater. In such a situation, the dispersing agent and the one or more of the free magnesium control agent and/or the seed material may be added to the waste water at a location that may allow the effective amount of the dispersing agent and the one or more of the free magnesium control agent and seed material to be achieved in a location of the wastewater treatment system that may experience the increased concentration of magnesium (e.g. which may result from the addition of the magnesium compound to the wastewater).

In the illustrated embodiment, wastewater may be received, collected and conveyed, by gravity and/or pumping at the wastewater collection system 10. In an embodiment, wastewater collection system 10 may include various transport pipes, collection boxes, maintenance holes, pumping stations, and the like. Wastewater collection system 10 may generally receive wastewater from various residential, commercial, and/or industrial sources. The wastewater received by wastewater collection system 10 may contain various quantities of organic materials, e.g., that may be quantified by one or more of biological oxygen demand (BOD), chemical oxygen demand (COD), total suspended solids (TSS), ammonia ($NH_3$), dissolved oxygen (DO), nitrate ($-NO_3$), sulfate ($-SO_4$), and/or various chemical characteristics such as pH and alkalinity. Various additional and/or alternative chemical components may also be included in wastewater received by wastewater collection system 10. In some situations, wastewater collection system 10 may be a source of nuisance odors, e.g., as a result of biological processes occurring within the wastewater and/or as a result of materials received from the various residential, commercial, and/or industrial sources. For example, nuisance odors may arise from $H_2S$ gas, organic and/or inorganic phosphorus and/or nitrogen compounds (e.g., which may include—$PO_4^{-3}$,—$NO_3^{-1}$, $NH_4^+$, etc.). In some embodiments, magnesium compounds may be added to wastewater within wastewater collection system 10 to mitigate such nuisance odors, as well as for other purposes (e.g., to reduce FOG accumulation and/or occlusions, to reduce entrainment of gasses within wastewater collection system 10, and/or to modify alkalinity, pH, and/or corrosivity of the wastewater, or the like). Similarly, an effective amount of the dispersing agent and one or more of the free magnesium control agent and the seed material may be added to wastewater within wastewater collection system 10 to control and/or reduce the formation and/or collection of struvite scale within wastewater collection system 10 and/or downstream aspects of the wastewater treatment system.

The wastewater collected at wastewater collection system 10 may be conveyed to a wastewater processing system (e.g., wastewater processing system 12). Wastewater received from wastewater collection system 10 may be received at headworks and preliminary treatment 14 of wastewater processing system 12. Headworks and preliminary treatment 14 of wastewater processing system 12 may provide, for example, removal of grit from the received waste water and preliminary screening. Headworks and preliminary treatment 14 may be a location within wastewater processing system 12 that may be prone to significant corrosion and odors. In some situations, the significant odors and corrosion may result from turbulent conditions imparted on the wastewater within headworks and preliminary treatment 14. In some embodiments, magnesium compounds may be added to wastewater within, and/or upstream of, headworks and preliminary treatment 14, e.g., to mitigate odors and/or corrosion within headworks and preliminary treatment 14, and/or for various additional and/or alternative purposes. Similarly, an effective amount of the dispersing agent and one or more of the free magnesium control agent and the seed material may be added to wastewater within, and/or upstream of, headworks and preliminary treatment 14 to control and/or reduce the formation and/or collection of struvite scale within headworks and preliminary treatment 14 and/or downstream aspects of the wastewater treatment system.

Primary treatment/clarification 16 may generally provide the first process within wastewater processing system 12 in which solids and water may diverge to follow separate treatment trains. In the example embodiment of FIG. 1, the diverging water and solids treatment trains may undergo various processes. For example, wastewater entering wastewater processing system 12 may be conveyed from primary treatment/clarification 16 to biological treatment 18, which may also be referred to as secondary treatment, whether the processing utilizes conventional active sludge (AS), sequential batch reactors (SBR), biological nutrient removal (BNR), enhanced nutrient removal (ENR), enhanced biological phosphorus removal (EBPR) or other processing. Processing within biological treatment 18 may include aerobic, anoxic, or anaerobic, as well as combinations thereof, which may variously facilitate removal and/or separation of organic materials, and/or constituents. Wastewater from biological treatment 18 may be conveyed to secondary/final clarification 20, where biosolids may be separated from the wastewater and may be transferred to a solids treatment train. Following secondary/final clarification 20, the waste water may undergo disinfection 22 and final effluent 24, e.g., which may include optional pH adjustment.

In the illustrative example of FIG. 1, a solids treatment train may treat solids that enter wastewater processing system 12, either directly and/or biosolids that may be generated within wastewater processing system 12 (e.g., via secondary/final clarification 20). For example, solids may undergo digestion 26, which may include aerobic and/or anaerobic processing. In some embodiments, digestion 26 may be preceded by a solids thickening process. The digested solids may undergo storage and/or post digestion 28. Solids transfer 30 may proceed from digestion 26 to and thru storage and dewatering. The solids accumulated, produced, and treated within wastewater processing system 12 may undergo dewatering 32 (e.g., via drying beds, filter presses, or centrifuge).

As generally described with respect to FIG. 1, a wastewater treatment system may include various collection, treatment, or processing operations. At least some of the collection and/or treatment operations may be facilitated by, and/or potential associated problems, drawbacks, or issues with such operations may be reduced and/or controlled through the addition of magnesium compounds to wastewater within the wastewater treatment system. In some situations, wastewater within the wastewater treatment system may contain the constituents for forming struvite, namely $Mg^{+2}$, $NH_4^+$ and $PO_4^{-3}$. Further, in some circumstances, adding magnesium compounds to wastewater within the wastewater treatment system may further contribute $Mg^{+2}$ constituents to the wastewater, which may result in, and/or accelerate or increase, the potential for the formation and/or collection of struvite scale within at least portions of the wastewater treatment system. Industrial wastewater, which may be collected and/or processed by the wastewater treatment system, may contain relatively high levels of phosphate, ammonia, and/or elevated pH, which may in some circumstances cause, or increase, the potential for the formation and/or collection of struvite scale within at least portions of the wastewater treatment system.

Consistent with some embodiments, the addition of an effective amount of a dispersing agent, alone and/or in conjunction with one or more of a free magnesium control agent and a seed material, may reduce and/or control the formation and/or collection of struvite scale within at least a portion of the wastewater treatment system. In an example situation, the addition of the effective amount of the dispersing agent and one or more of the free magnesium control agent and the seed material may reduce the potential for the formation of struvite scale within at least a portion of the wastewater treatment system.

In an example wastewater treatment system, such as shown in FIG. 1, the potential for struvite formation and/or collection may be relatively greater in anaerobic digesters, sludge storage and/or sludge dewatering processes and/or related equipment. For example, the potential for struvite scale formation and/or collection may be relatively greater in transfer pipelines, pumps, valves, mixer blades, tank walls, and the like. In some situations, the potential for struvite formation and/or collection may be relatively greater as a result of turbulence triggers and/or localized pH conditions that may facilitate struvite formation and/or collection. For example, the potential for struvite scale formation and/or collection may be relatively higher in belt filter presses, filtrate lines, digesters, digested sludge, holding tanks, sludge transport lines, pumps and valves. In such locations and/or processes the necessary constituents of struvite (e.g., $Mg^{+2}$, $NH_4^+$ and $PO_4^{-3}$) may be relatively higher, and consequently, small changes in pH may trigger substantial struvite formation. Accordingly, in some embodiments, the effective amount of the dispersing agent and one or more of the free magnesium control agent and the seed material may be added to, and/or upstream relative to, the collection system, an anaerobic digester, a storage tank or process, a dewatering process and/or side stream biological systems downstream of an anaerobic digester.

Consistent with the foregoing description, in an embodiment, one or more of the magnesium compound and the effective amount of the dispersing agent and one or more of the free magnesium control agent and the seed material may be added to wastewater within a wastewater collection system. In some embodiments, one or more of the magnesium compound and the effective amount of the dispersing agent and one or more of the free magnesium control agent and the seed material may be added to wastewater within a wastewater treatment process (e.g., which may include a wastewater treatment facility or plant, and/or an individual wastewater treatment process within a wastewater treatment facility or plant). Further, one or more of the magnesium compound and the effective amount of the dispersing agent and one or more of the free magnesium control agent and the seed material may be added to wastewater within a wastewater collection system and one or more of the magnesium compound and the effective amount of the dispersing agent and one or more of the free magnesium control agent and the seed material may be added to wastewater within a wastewater treatment process (e.g., which may include a wastewater treatment facility or plant, and/or an individual wastewater treatment process within a wastewater treatment facility or plant).

As generally discussed above, adding the magnesium compound to wastewater within a wastewater treatment system may include adding the magnesium compound to wastewater at, and/or upstream, of a location of the wastewater treatment system at which the action of the magnesium compound (e.g., corrosion prevention, odor reduction, etc.) is desired. Similarly, adding the effective amount of the dispersing agent and the one or more of the free magnesium control agent and the seed material may include adding the effective amount of the dispersing agent and the one or more of the free magnesium control agent and the seed material at, and/or upstream, of a location at which struvite scale control and/or reduction is desired. In some embodiments, the magnesium compound and the effective amount of the dispersing agent and the one or more of the free magnesium control agent and the seed material may be added at the same location within the wastewater treatment system. In such embodiments, the magnesium compound and the dispersing agent, alone and/or in conjunction with one or more of a free magnesium control agent and a seed material, may be added together, for example as separate components added at a common location, as an admixture added at a location, and/or as various individual components and admixtures of individual components added at a common location. In some embodiments, the magnesium compound and the effective amount of the dispersing agent and the one or more of the free magnesium control agent and the seed material may be added to wastewater within the wastewater treatment system at different locations. In such embodiments, the magnesium compound and the dispersing agent, alone and/or in conjunction with one or more of a free magnesium control agent and a seed material may be added to wastewater within the wastewater treatment system at different locations as individual components and/or as admixtures of individual components. For example, an admixture of the magnesium compound and the dispersing agent may be added at one location and an admixture of a free magnesium control agent and a seed material may be added at another location. In a similar embodiment, the magnesium compound may be added at one location, and admixture of a dispersing agent and a free magnesium control agent may be added at another location, and a seed material may be added at the same location as the magnesium compound, at the same location as the admixture of the dispersing agent and the free magnesium control agent, and/or at a different location. Various additional/alternative embodiments may be equally utilized.

In an embodiment, a method may include adding the magnesium compound to wastewater at a first location within the wastewater treatment system. The method may also include adding the effective amount of the dispersing agent, along and/or in conjunction with the one or more of the free magnesium control agent and the seed material, to wastewater at a second location within the wastewater treatment system different from the first location. The second location may be either upstream or downstream from the first location. For example, in some embodiments, the effective amount of the dispersing agent and the one or more of the free magnesium control agent and the seed material may be added near, and/or upstream from, a location within the wastewater treatment system having a relatively higher potential for the formation and/or collection of struvite scale. In some embodiments, the dispersing agent, alone and/or in conjunction with one or more of the free magnesium control agent and the seed material, may be added at the second location which may be upstream of the first location (i.e., the location at which the magnesium compound may be added to the wastewater treatment system). In such an embodiment, the dispersing agent (alone and/or in conjunction with one or more of the free magnesium control agent and the seed material) may precondition the wastewater. In an embodiment, preconditioning the wastewater may reduce the likelihood and/or occurrence of struvite scale formation upon the addition of the magnesium compound at the first location (e.g., which may be downstream from the second location). The effective amount of the dispersing agent and the one or more of the free magnesium control agent and the seed material may be added to wastewater within the wastewater treatment system at the same location as one another. In some embodiments, each of the effective amount of the dispersing agent and the one or more of the free magnesium control agent and the seed material may be added to wastewater within the wastewater treatment system at different locations from one another.

As generally described above, in some embodiments the magnesium compound and one or more of the effective amount of the dispersing agent and the at least one of the free magnesium control agent and the seed material may be added to wastewater at a generally common location within the wastewater treatment. In such an embodiment, the effective amount of the dispersing agent and at least one of the free magnesium control agent and the seed material may be present in the same flow of wastewater as the added magnesium compound. In some embodiments, adding the magnesium compound, and adding the effective amount of the dispersing agent and the one or more of the free magnesium control agent and the seed material may include adding an admixture including the magnesium compound, and the effective amount of the dispersing agent, and the one or more of the free magnesium control agent and the seed material to wastewater within the wastewater treatment system. As also discussed, in some embodiments the magnesium compound may be added to wastewater within the wastewater treatment system separately from the effective amount of the dispersing agent and the one or more of the free magnesium control agent and the seed material. In various embodiments, the effective amount of the dispersing agent and the one or more of the free magnesium control agent and the seed material may be separately added to wastewater within the wastewater treatment system, and/or may be added to wastewater within the wastewater treatment system as an admixture.

In an embodiment, a method for controlling the formation and/or collection of struvite scale within a wastewater treatment system may include measuring struvite scale formation within the wastewater treatment system. Measuring struvite scale formation within the wastewater treatment system may include, for example, visually inspecting at least a portion of the wastewater treatment system for the presence of struvite scale. Further, measuring struvite scale formation within at least a portion of the wastewater treatment system may also include determining a quantitative and/or qualitative relative amount of struvite scale formation within the portion of the wastewater treatment system. As generally discussed above, in some circumstances, struvite scale formation and/or collection may tend to occur, e.g., in transfer pipelines, pumps, valves, mixer blades, tank walls, belt filter presses, filtrate lines, digesters, digested sludge, and the like. Measuring struvite scale formation may include visually inspecting one or more of such locations for the presence and/or relative quantity of struvite scale formation and/or collection.

In addition/as an alternative to visual inspections, other techniques may also be utilized for measuring struvite scale formation. For example, struvite scale formation may be inferred and/or measured based on a decrease in performance and/or efficiency within the wastewater treatment system, such as a decrease in pump efficiency, pipeline throughput, valve operation, etc., which may be the result of struvite scale formation. In another example, struvite scale formation may be measured based on, e.g., a chemical analysis of wastewater within at least a portion of the wastewater treatment system. For example, a decrease in the constituents of struvite (e.g., $Mg^{+2}$, $NH_4^+$ and $PO_4^{-3}$) may be indicative of struvite formation. For example, the formation of struvite within the wastewater treatment system may result in a decrease in constituents of struvite in wastewater flows downstream from the location of the struvite formation. Various additional and/or alternative methods may be utilized for measuring the formation of struvite within the wastewater treatment system.

Based upon, at least in part, measurements of the formation of struvite within at least a portion of the wastewater treatment system, a concentration of one or more of the dispersing agent and the one or more of the free magnesium control agent and the seed material may be adjusted. For example, in the event that measuring the formation of struvite indicates that undesirable amounts of struvite are forming and/or collecting within at least a portion of the wastewater treatment system, the concentration of one or more of the dispersing agent and the one or more of the free magnesium control agent and the seed material may be adjusted, e.g., to reduce struvite formation within the wastewater treatment system. In some embodiments, the quantity of one or more of the dispersing agent and the one or more of the free magnesium control agent and the seed material may serve as a proxy for the concentration of the added dispersing agent, free magnesium control agent, and/or the seed material.

As discussed above, the concentration of one or more of the dispersing agent and the one or more of the free magnesium control agent and the seed material may be adjusted to reduce the formation of struvite scale within the wastewater treatment system. The concentration of one or more of the dispersing agent and the one or more of the free magnesium control agent and the seed material may be adjusted to achieve a desired level of struvite reduction efficiency. For example, completely eliminating struvite scale formation from within at least a portion of the wastewater treatment system requires a relatively large (e.g., and therefore costly) amount of the dispersing agent and one or more of the free magnesium control agent and the seed material. Further, in some situations, the complete elimination of struvite may not be possible. Further, some level of struvite formation may be acceptable, for example, as not unduly compromising the efficiency and/or operation of the wastewater treatment system. Accordingly, adjusting the concentration of the dispersing agent and the one or more of the free magnesium control agent and the seed material may include increasing and/or decreasing the concentration of the dispersing agent and the one or more of the free magnesium control agent and the seed material to achieve a desired balance between reduction of struvite scale within at least a portion of the wastewater treatment system and the cost of achieving a further reduction of struvite scale within the wastewater treatment system.

Consistent with the foregoing, a magnesium compound may be added to wastewater within a wastewater treatment system to facilitate various processes and/or to reduce or eliminate potential sources of inefficiencies (e.g., FOG accumulation, gas entrainment within wastewater, etc.), and/or eliminate potential undesirable circumstances (e.g., corrosion, nuisance odors, undesirable alkalinity or pH conditions, etc.), and/or to achieve other effects. In some embodiments, the magnesium compound may be added to the wastewater as a slurry and/or as a powder. Further, as discussed above an effective amount of a dispersing agent and one or more of a free magnesium control agent and a seed material may be added to wastewater within a wastewater treatment system to control struvite scale formation and/or collection. In some embodiments, the dispersing agent, the free magnesium control agent, and/or the seed material may be added to wastewater within the wastewater treatment system along with the magnesium compound. In an embodiment, an admixture including the magnesium compound and an effective amount of the dispersing agent and the one or more of the free magnesium control agent and the seed material may be added to wastewater within the wastewater treatment system. In various embodiments, the admixture including the magnesium compound, the dispersing agent, and the one or more of the free magnesium control agent and the seed material may be provided as a slurry, as a power, and/or may otherwise be provided.

In some embodiments, one or more of the dispersing agent, the free magnesium control agent, and the seed material may be added to wastewater within the wastewater treatment system separately from the magnesium compound. In an embodiment, an admixture including the dispersing agent and the one or more of the free magnesium control agent and the seed material may be added to wastewater within the wastewater treatment system separately from the magnesium compound. In various embodiments, the admixture of the dispersing agent and the one or more of the free magnesium control agent and the seed material may be provided as a slurry, a powder, and/or otherwise provided.

A dispersing agent may include an agent that may, at least in part, facilitate maintaining at least a portion of a the magnesium compound added to wastewater within the wastewater treatment system dispersed therein, so as to reduce precipitation of the magnesium compound. Further, keeping at least a portion of the magnesium compound dispersed may reduce and/or prevent reaction of the magnesium compound with ammonia and/or phosphate to form struvite scale. The dispersing agent may include, for example, a nonionic, a cationic, and/or an amphoteric surfactant, as well as combinations thereof. The dispersing agent may include, but is not limited to, one or more of a polyacrylate, a polyamide, a polyacrylamide, a polyphosphate, a polyethylene glycol ester, an ethoxylated alkyl phenol, an ethoxylated polyhydric alcohol, an ethoxylated polyhydric ether, and an ethoxylated polyhydric ester, and others such as polycarboxylates, polymaleic acids, and polymaleic anhydrides.

In an example embodiment, a suitable dispersing agent may be based on a polymeric acrylate, such as supplied under the trade name of Flosperse™ by SNF Inc. In some embodiments, enhanced and/or synergistic effects may be realized by combining certain dispersing agents. For example, a system of dispersing agents may be achieved including a polyacrylate blended with an ethoxylated polyhydric alcohol. In a particular case, such a dispersing agent system may be beneficial in circumstances in which FOG accumulation may exist within the wastewater treatment system. The enhanced effects of using such a system of dispersing agents in the presence of FOG may be based on, at least in part, Hydrophilic/Lipophilic Balance (HLB) requirements.

According to various embodiments, one or more dispersing agents may be added to wastewater within the wastewater treatment system in a range of approximately 0.1 mg/L to approximately 200 mg/L. In an illustrative embodiment, the one or more dispersing agents may be added to wastewater within a wastewater treatment system in an amount of between about 2.0 mg/L to about 6.0 mg/L. As generally discussed above, the one or more dispersing agents may be added directly to the wastewater within the wastewater treatment system, and/or may be combined in an admixture with at least the magnesium compound. In an embodiment in which the dispersing agent may be combined in an admixture with the magnesium compound, the admixture may include between about 0.01% to about 90% of the dispersing agent relative to the weight of the magnesium compound. Further, a slurry admixture may include between about 0.01% to about 50% of the dispersing agent by weight of the slurry. It will be appreciated that the exact amount of the dispersing agent may be selected and/or varied to achieve a desired reduction in struvite scale formation within the wastewater treatment system. As such, the illustrative ranges should be construed as illustrative and not as a limitation. Further, while not specifically described various additional ranges, within the described dosage ranges, may also be utilized.

An illustrative example of slurry admixture formulation including a magnesium compound and utilizing a polyacrylate as a dispersing agent is detailed below in Table 3. Various additional/alternative admixtures may be provided consistent with the present disclosure.

TABLE 3

| Component | % Concentration (based on wt./wt. basis) |
| --- | --- |
| Magnesium hydroxide | 53.2% |
| Polyacrylate Dispersant (50% active) | 2.3% |
| Water (distilled) | 44.5% |

As generally discussed above, in some situations the availability of $Mg^{+2}$ within the wastewater may be a limiting factor on the formation of struvite scale. In some embodiments, the free magnesium control agent may be effective in reducing and/or restricting the availability of $Mg^{+2}$ within the wastewater for reacting with free phosphorous or nitrogen. For example, in an embodiment the free magnesium control agent may chemically react with free magnesium ions (e.g., which may be present in, or provided by an added magnesium compound, such as an $Mg(OH)_2$ slurry; and/or may be otherwise present in the wastewater), and may thereby prevent such magnesium ions from reacting with free phosphorous or nitrogen ions. In some embodiments, the free magnesium control agent may either sequester or chelate free magnesium and prevent and/or reduce the formation of struvite.

As discussed above, in some embodiments, the free magnesium control agent may include a sequestering agent and/or a chelating agent. For example, the free magnesium control agent may include, but is not limited to, one or more of a salt of a polyamine acetic acid, an acid of a polyamine acetic acid (e.g., ethylene diamine tetraacetic acid (EDTA), nitrilotriacetic acid (NTA), cyclohexane diamine acetic acid (CDTA), diethylene triamine pentaacetic acid (DTPA)), an oxylate (e.g., sodium oxylate), a polyphosphonic acid, a polyphosphate (e.g., sodium tetrasodiumpryophosphate (TSPP), hexametaphosphate (SHMP) and others), a gluconate (e.g., sodium gluconates), a carboxylate polymer, and a polyaspartic acid, as well as other chemicals that may have chelation properties to magnesium, phosphate and/or ammonium. In general, many varieties of chelants and/or sequestrants may be utilized as free magnesium control agents to reduce and/or prevent the formation of struvite within at least a portion of a wastewater treatment system. In an example embodiment, the free magnesium control agent may include a salt and/or an acid of ethylene diamine tetraacetic acid.

According to various embodiments, one or more free magnesium control agents may be added to wastewater within a wastewater treatment system at a dosage of between about 0.01 mg/L to about 200 mg/L of the system to be treated. In a particular illustrative embodiment, one or more free magnesium control agents may be added to wastewater within a wastewater treatment system at a dosage of between about 0.1 mg/L to about 6.0 mg/L of the system to be treated. Consistent with the foregoing description, in some embodiments the free magnesium control agent may be added directly to wastewater within the wastewater treatment system, and/or may be combined in an admixture with at least the magnesium compound. In an embodiment in which the free magnesium control agent is combined in an admixture with the magnesium compound, the admixture may include between about 0.01% to about 90% of the free magnesium control agent relative to the weight of the magnesium compound. Further, in an embodiment in which the magnesium compound may be provided as a slurry, a slurry admixture may include between about 0.01% to about 50% of the free magnesium control agent by weight of the slurry. It will be appreciated that the exact amount of the free magnesium control agent may be selected and/or varied to achieve a desired reduction in struvite scale formation within the wastewater treatment system. As such, the illustrative ranges should be construed as illustrative and not as a limitation. Further, while not specifically described various additional ranges, within the described dosage ranges, may also be utilized.

An illustrative example of a slurry admixture including a magnesium compound and utilizing diethylene triamine pentaacetic acid (DPTA) as a free magnesium control agent is detailed below in Table 4. Various additional/alternative admixtures may be provided consistent with the present disclosure.

TABLE 4

| Component | % Concentration (based on a wt./wt. basis) |
| --- | --- |
| Magnesium Hydroxide | 52.0% |
| Diethylyene triamine pentaacetic acid (DTPA) | 9.8% |
| Water (distilled) | 38.2% |

In some embodiments, seed materials may be added to wastewater within a wastewater treatment system, at least in part, to reduce and/or assist in reducing the formation of struvite scale within at least a portion of the wastewater treatment system. In some situations, the seed material added to wastewater having the potential for struvite formation (e.g., wastewater that may contain $Mg^{+2}$, $NH_4^+$ and $PO_4^{-3}$) may act as an attractant for one or more of free magnesium, free ammonium, and/or free phosphate compounds within the wastewater. As discussed above, one or more of the free magnesium, free ammonium, and/or free phosphate compounds may be the result of additions to the wastewater (e.g., in the form of added magnesium compounds and/or added ammonium or phosphate compounds) and/or may result from various treatment processes and/or decomposition of materials within the wastewater. In some embodiments, the seed material may attract struvite to form on the surface of the seed material, and may grow in size (e.g., due to the accumulation of struvite) while staying dispersed in the wastewater. To the extent that the seed material (including any accumulated struvite thereon) may remain dispersed in the wastewater (e.g. and not fall out of suspension), the seed material may prevent and/or reduce the formation of struvite scale building upon on metallic, plastic, and/or concrete surfaces, which may lead to occlusion and/or impairment of free flowing wastewater through at least the affected portions of the wastewater treatment system. In this regard, in some embodiments, struvite scale may preferentially form and/or accumulate on the seed material and, therefore, remain dispersed in the wastewater.

The seed material may include a material in the form of small crystals. For example, the seed material may include particles and/or crystals having a length of between about 0.2 microns to about 1.0 millimeters. In an embodiment, the seed material may include particles and/or crystals having a length of between about 2.0 microns to about 0.1 millimeters. Examples of suitable seed materials may include, but are not limited to, one or more of struvite seeds (e.g., as described in U.S. patent application Ser. No. 13/613,963, entitled "Methods and Compositions for the prevention of Struvite Scale Formation in Wastewater Systems," filed on 13 Sep. 2012, which claims the benefit of U.S. provisional patent application Ser. No. 61/535,706, filed on 16 Sep. 2011, the entire disclosures of both of which are incorporated herein by reference), a micro-silica, aluminum; iron, titanium, tin, copper, molybdenum, manganese, lanthanum, selenium, a zeolite, clay, and volcanic ash, as well as other materials that have an affinity for struvite components (i.e., magnesium, phosphate and ammonium). A micro-silica may include, for example, one or more of a silica fume, a fumed silica, and a colloidal silica. In some embodiments, the seed materials may be based on micro-silicas and/or metals. Further, in some instances synergistic combinations of seed materials may be realized in the form of blends of micro-silicas with metals. In one example embodiment, the seed material may include a combination of micro-silica and aluminum. The composition of the seed material and/or combination of seed materials may be based on, at least in part, the actual conditions within the wastewater treatment system. For example, in a situation in which an excess of phosphate is present within the wastewater, the use of a combination of aluminum and lanthanum seed materials may provide advantageous results, e.g., by attracting free phosphate compounds.

According to various embodiments, one or more seed materials may be added to wastewater within the wastewater treatment system in a dosage range of between about 0.1 mg/L to about 200 mg/L into the system to be treated. In a particular illustrative embodiment, one or more seed materials may be added to wastewater within the wastewater treatment system at a dosage of between about 2.0 mg/L to about 6.0 mg/L in the system to be treated. As generally discussed above, the one or more seed materials may be added directly to the wastewater within the wastewater treatment system and/or may be combined in an admixture with at least the magnesium compound. In an embodiment in which the seed material is combined in an admixture with the magnesium compound, the admixture may include between about 0.01% to about 90% of the seed material relative to the weight of the magnesium compound. The admixture may include, for example, a dry admixture, a slurry, and/or another admixture. In an embodiment in which the admixture may include a slurry, the slurry admixture may include between about 0.001% to about 50% of the seed material includes by weight of the slurry.

An illustrative example of a slurry admixture including magnesium hydroxide and fumed silica as a seed material is detailed below in Table 5. Various additional and/or alternative admixtures may be provided consistent with the present disclosure.

TABLE 5

| Component | % Concentration (based on a wt./wt. basis) |
|---|---|
| Magnesium Hydroxide | 55.0% |
| Fumed Silica | 1.6% |
| Water (distilled) | 43.4% |

In some embodiments, which may be based on, at least in part, particular chemistries and/or conditions of the wastewater within at least a portion of the wastewater treatment system, synergistic effects for reducing and/or preventing the formation and/or accumulation of struvite scale within at least a portion of the wastewater treatment system may be achieved through particular combinations of dispersing agents and seed materials, particular combinations of dispersing agents and free magnesium control agents. Further advantageous combinations of particular dispersing agents, with particular free magnesium control agents, and particular seed materials may also be realized. The relative levels, or concentration, of each component may depend, at least in part, on the desired effect and the nature of the components. Such combinations of components, added directly to wastewater within the wastewater treatment system and/or utilized in an admixture with a magnesium compound, such as in a magnesium hydroxide slurry, may provide cost effective control and/or reduction of struvite scale within portions of the wastewater treatment system, such as collections systems, aerobic and/or anaerobic digesters, transition areas, and the like.

In an illustrative embodiment, a slurry admixture may include magnesium hydroxide in combination with a polyacrylate dispersing agent, an ethylene diamine tetraacetic acid sequestering agent (e.g., free magnesium control agent), and a silica fume seed material. Each of the dispersing agent, the free magnesium control agent, and the seed material may be provided at between about 0.01% to about 10.0% based on the weight of the magnesium hydroxide. Further admixtures, for example, include various combinations of dispersing agents, free magnesium control agents, and seed materials. In some embodiments, the selected components may be added to wastewater within the wastewater treatment system at dosages of between about 0.01 mg/L to about 500 mg/L into the system to be treated. In a particular illustrative embodiment, the combined selected components may be added to wastewater within the wastewater treatment system at a dosage of between about 0.01 mg/L to about 50.0 mg/L in the system to be treated. In an illustrative embodiment in which the combined components may be combined in admixture with a magnesium compound slurry, the combined selected components may include between about 0.01% to about 50% by weight of the slurry.

A slurry admixture may include a scale reducer. For example, a scale reducer may assist in removing at least a portion of any pre-existing struvite scale that may have accumulated within at least a portion of the wastewater treatment system. Further, a scale reducer may assist in removing at least a portion any struvite scale that forms within at least a portion of the wastewater treatment system (e.g., which formation may be at least partially reduced consistent with the present disclosure). In an embodiment, the scale reducer may include one or more of ascorbic acid, citric acid, acetic acid, and an organic derivative of one or more of ascorbic acid, citric acid, acetic acid, and an alkyl amine acetic acid. In some embodiments, the scale reducing may include an inorganic acid, such as hydrochloric acid, sulfuric acid, as well as other inorganic acids. The scale reducing agent may be added to wastewater within the wastewater treatment system at a dosage of between about 0.1 mg/L to about 200 mg/L into the system to be treated. In an illustrative embodiment, the scale reducing agent may be added to wastewater within the wastewater treatment system at a dosage of between about 2.0 mg/L to about 6.0 mg/L in the system to be treated. In a similar manner to the dispersing agent, the free magnesium control agent, and/or the seed material, the scale reducing agent may be added directly to the wastewater within the wastewater treatment system. Further, the scale reducing agent may be combined in an admixture with one or more other components. For example, the scale reducing agent may be combined in an admixture including at least the magnesium compound. As described above, an admixture include the magnesium compound may include a slurry. According to an illustrative embodiment, the slurry admixture may include between about 0.01% to about 50% of the scale reducer by weight of the slurry.

In an illustrative example, a scale reducing agent may be used in combination with one or more struvite scale reducing additives, such as a dispersing agent and one or more of a free magnesium control agent and a seed material. In such a combination, the scale reducing agent may be added to wastewater within the wastewater treatment system at a dosage of between about 0.1 mg/L to about 1.0 g/L into the system to be treated. In one particular illustrative embodiment, a scale reducing agent included in combination with one or more struvite scale reducing additives may be added to wastewater within a wastewater treatment system at a dosage of between about 2.0 mg/L to about 500 mg/L in the system to be treated. The combination of the scale reducing agent and the struvite scale reducing additives may be added directly to wastewater within the wastewater treatment system, and/or may be combined in admixture with a magnesium compound. In one embodiment in which the combination of the scale reducing agent and the one or more scale reducing additives are combined in admixture with a magnesium compound, the admixture may include a magnesium hydroxide slurry, and the concentration of the combined scale reducing agent and the one or more scale reducing additives maybe provided at between out 0.01% to about 50% by weight of the slurry.

An example of an embodiment of a slurry admixture including magnesium hydroxide as a magnesium compound, ethylene diamine tetraacidic acid (EDTA) as a free magnesium control agent, polyacrylamide as a dispersing agent, silica fume as a seed material, and ascorbic acid as a scale reducing agent is detailed below in Table 6. Various additional/alternative admixtures may be provided consistent with the present disclosure.

TABLE 6

| Component | % Concentration (based on a wt./wt. basis) |
| --- | --- |
| Magnesium Hydroxide | 50.4% |
| Ethylene diamine tetraacidic acid (EDTA) | 2.7% |
| Polyacrylamide Dispersant (60% active) | 1.5% |
| Silica Fume Seed | 0.5% |
| Ascorbic Acid | 1.1% |
| Water | 43.8% |

Consistent with the foregoing description, magnesium compounds, such as magnesium oxide and magnesium hydroxide, may be used in various applications in wastewater treatment, including, but not limited to, odor control in a wastewater treatment system; biological treatment of BOD, TSS, $NH_3$, TN, and TP; digestion of waste solids, which may also include methane generation; and pre-dewatering conditioning and odor reduction of biosolids. Further, an effective amount of a dispersing agent and one or more of a free magnesium control agent and a seed material may also be used in connection with wastewater treatment, for example, to reduce the formation and/or collection of struvite scale within at least a portion of the wastewater treatment system. In some embodiments, an effective amount of a magnesium compound and an effective amount of a free magnesium control agent may be used in connection with wastewater treatment. In some embodiments, an effective amount of a magnesium compound, and effective amount of a free magnesium control agent, and an effective amount of a seed material may be used in connection with wastewater treatment. In some embodiments, an effective amount of a magnesium compound and an effective amount of a seed material (e.g., which include one or more of a micro-silica, aluminum, iron, titanium, tin, copper, molybdenum, manganese, lanthanum, selenium, zeolites, clay, and volcanic ash) may be used in connection with wastewater treatment. In some embodiments, an effective amount of a scale reducing agent may be included in combination with any of the foregoing.

In an example embodiment, magnesium hydroxide may be combined with one or more of seed materials, one or more dispersing agents, and/or one or more free magnesium control agents to reduce and/or prevent the formation of struvite scale in at least a portion of a wastewater treatment system, for example, a centrate side stream process of a wastewater treatment system, which may be designed to reduce ammonia levels in the centrate or filtrate arising from digested biosolids and sludge. For example, when a supernatant is separated from digested waste, the resultant centrate or filtrate may be recycled through one or more wastewater treatment processes and/or may be treated in a side stream process. The centrate may generally contain relatively high levels of magnesium, ammonia and phosphate. Such relatively high levels of magnesium, ammonia and phosphate may result in the precipitation of struvite, for example if the centrate is exposed to the appropriate combinatorial conditions of pH for spontaneous formation and/or seeding for catalytic formation. In some situations, the precipitated struvite results in the formation of struvite scale and/or struvite as a suspended nutrient by-product.

As an example, in a side stream process that may be designed to reduce ammonia levels, various alkalinity supplements may be utilized to maintain pH stability of the side stream process. For example, biological reduction of ammonia, which may be referred to as nitrification, may produce various acids, such as nitric acid, nitrous acid, and carbonic acid. The production of such acids may generally result in a decrease in the pH of the centrate being processed and/or of the resulting effluent. As such side stream ammonia removal processes, such as a conventional nitrification process and/or any of several proprietary processes such as the SHARON® process, produce acids, these processes may require additional alkalinity to stabilize the pH of the process. In some situations, the combination of relatively high pH, that may result from alkalinity addition, and the presence of magnesium, ammonia and phosphate may lead to the formation of struvite scale. The addition of an effective amount of a dispersing agent and one or more of a free magnesium control agent and a seed material may allow for efficient use of alkaline supplements, such as magnesium hydroxide, to stabilize the pH of the ammonia removal process (e.g., by which ammonia may be remove from centrate), while reducing and/or controlling the formation of struvite scale.

For example, an admixture including a hydroxide slurry in combination with an effective amount of a dispersing agent and one or more of a free magnesium control agent and a seed material may be added to wastewater at one or more of several possible locations within the wastewater treatment system (e.g., within the particular side stream wastewater treatment process). Similarly, the magnesium hydroxide slurry, the dispersing agent, and the one or more of the free magnesium control agent and the seed material may be separately added, and or added in various sub-combinations, as the one or more locations within the wastewater treatment system (e.g., within the particular side stream wastewater treatment process). The injection point or points (i.e., the point or points at which the various materials may be added to the wastewater within the wastewater treatment system) may vary for different application (e.g., to provide an effective concentration of each material at the desired location of activity), and the point or points of injection may be selected based upon, at least in part, the site and the desired application. In the example of a process for removing ammonia from centrate in a side stream process, the magnesium compound and the dispersing agent and the one or more of the free magnesium control agent and the seed material may be added to wastewater in the wastewater treatment system, for example, at the influent of centrate/filtrate to the side stream process. In another example, the magnesium compound, the dispersing agent and the one or more of the free magnesium control agent and the seed material may be added to wastewater within the wastewater treatment system at multiple points other than at the influent of the centrate/filtrate. The selection of application points may be based upon, at least in part, consideration of alkalinity and pH profiles in relation to the reduction of ammonia through the process.

In another example, magnesium hydroxide may be combined with a dispersing agent and one or more of a free magnesium control agent and a seed material to prevent and/or reduce the formation of struvite scale within digesters of a wastewater treatment system. For example, in a wastewater treatment plant anaerobic digesters may be utilized to treat solid waste received by, and/or produced by, the wastewater treatment plant. In some situations, the digestion process may result in relatively high levels of magnesium, ammonia, and/or phosphate components in the supernatant, liquid portion, of the digested waste. The relatively high levels of magnesium, ammonia and/phosphate components in the supernatant, when exposed to the appropriate combinatorial conditions of pH for spontaneous formation and/or seeding for catalytic formation, may experience the precipitation of struvite. Such precipitation of struvite may manifest as struvite scale (e.g., which may form in the digester and/or in downstream equipment), or as a suspended nutrient by-product. Further, the digestion process may generate acids, and in a similar manner as various other biological wastewater treatment processes that may be utilized in wastewater treatment plants (such as municipal wastewater treatment plants), an alkaline source such as magnesium hydroxide, caustic soda, or lime, may be desirably used as an alkaline supplement to improve overall performance of the digestion process and/or operation of the wastewater treatment system overall.

In a generally similar manner as described above, a dispersing agent and one or more of a free magnesium control agent and a seed material may be added to wastewater within a digester to prevent and/or reduce the formation and/or collection of struvite scale within the digester and/or in downstream locations. In some embodiments, the dispersing agent and the one or more of the free magnesium control agent and the seed material may be added to the wastewater within the digester in combination with (e.g., and/or separately from) a magnesium compound, which may provide an alkaline source. Adding the dispersing agent and the one or more of the free magnesium control agent and the seed material (e.g., and the magnesium compound) to wastewater within the digester may include adding the materials to the digester, adding the materials at an upstream location (e.g., such that an effective amount may be present in the digester), and/or at a downstream location from the digester (e.g., in a situation in which the conditions arising in and/or from the digester may tend to result in struvite scale formation downstream from the digester).

In yet another example, a magnesium hydroxide material may be combined (and/or separately added) with a dispersing agent and one or more of a free magnesium control agent and a seed material to prevent and/or reduce struvite scale formation in centrate return lines. In such an embodiment, the dispersing agent and the one or more of the free magnesium control agent and the seed material may be added to wastewater within the centrate return lines and/or upstream of the centrate return lines, to thereby prevent and/or reduce the formation of struvite scale within the centrate return line. Various additional and/or alternative embodiments will be appreciated.

A number of implementations have been described. Nevertheless, it will be understood that various modifications may be made. Accordingly, other implementations are within the scope of the following claims.

What is claimed is:

1. A method for treating wastewater comprising:
   adding a magnesium compound to wastewater within a wastewater treatment system, the wastewater treatment system including a municipal wastewater treatment system; and
   adding an effective amount of a dispersing agent, the dispersing agent including one or more polymeric surfactants, and a free magnesium control agent, wherein the free magnesium control agent is selected from the group consisting of one or more of a salt of a polyamine acetic acid, an acid of a polyamine acetic acid, an oxylate, a gluconate, a carboxylate polymer, and a polyaspartic acid, to the wastewater within the wastewater treatment system to reduce the formation of struvite scale within the wastewater treatment system.

2. The method of claim 1, further comprising:
   measuring struvite scale formation within the wastewater treatment system; and
   adjusting a concentration of one or more of the dispersing agent and the free magnesium control agent to reduce the struvite scale formation within the wastewater treatment system.

3. The method of claim 1, wherein adding the magnesium compound, and adding the effective amount of the dispersing agent and the free magnesium control agent includes adding an admixture including the magnesium compound, and the effective amount of the dispersing agent, and the free magnesium control agent to wastewater within the wastewater treatment system.

4. The method of claim 1, including:
   adding the magnesium compound to wastewater at a first location within the wastewater treatment system;

adding the effective amount of the dispersing agent, and the free magnesium control agent to wastewater at a second location within the wastewater treatment system different from the first location.

5. The method of claim 1, including adding one or more of the magnesium compound and the effective amount of the dispersing agent and the free magnesium control agent to wastewater within a wastewater collection system.

6. The method of claim 1, wherein the magnesium compound includes one or more of magnesium oxide and magnesium hydroxide.

7. The method of claim 6, wherein the magnesium compound includes magnesium hydroxide, and wherein the magnesium hydroxide exhibits an alkaline magnesium hydroxide purity of between about 85% to about 100%; a caustic magnesia activity of between about 50 seconds to about 1440 minutes; a particle size of between about 0.1 micron to about 50 microns; a specific surface area of between about 9 $m^2/g$ to about 200 $m^2/g$; and a stabilized residuals test value of between about 1 milligram to about 50 grams.

8. The method of claim 6, wherein the magnesium compound includes magnesium oxide, and wherein the magnesium oxide exhibits an alkaline magnesium oxide purity of between about 85% to about 100%; a caustic magnesia activity of between about 50 seconds to about 1000 seconds; a particle size of between about 0.1 micron to about 30 microns; and a specific surface area of between about 9 $m^2/g$ to about 300 $m^2/g$.

9. The method of claim 1, wherein the dispersing agent includes one or more of a polyacrylate, a polyamide, a polyacrylamide, a polyethylene glycol ester, an ethoxylated alkyl phenol, an ethoxylated polyhydric alcohol, an ethoxylated polyhydric ether, and an ethoxylated polyhydric ester.

10. The method of claim 1, wherein the effective amount of the dispersing agent includes between about 0.01% to about 90% of the dispersing agent relative to the weight of the magnesium compound.

11. The method of claim 3, wherein the admixture includes a slurry including between about 0.01% to about 50% of the dispersing agent by weight of the slurry.

12. The method of claim 1, wherein the effective amount of the free magnesium control agent includes between about 0.01% to about 90% of the free magnesium control agent relative to the weight of the magnesium compound.

13. The method of claim 3, wherein the admixture includes a slurry including between about 0.01% to about 50% of the free magnesium control agent by weight of the slurry.

14. The method of claim 1, further comprising adding an effective amount of a seed material to further reduce the formation of struvite scale within the waste water treatment system, the seed material including one or more of struvite seeds, a micro-silica, aluminum, iron, titanium, tin, copper, molybdenum, manganese, lanthanum, selenium, zeolites, clay, and volcanic ash.

15. The method of claim 14, wherein the seed material includes a combination of micro-silica and aluminum.

16. The method of claim 14, wherein the seed material includes particles having a length of between about 0.2 microns to about 1.0 millimeters.

17. The method of claim 14, wherein the effective amount of the seed material includes between about 0.01% to about 90% of the seed material relative to the weight of the magnesium compound.

18. The method claim 14, wherein adding the magnesium compound, the effective amount of the dispersing agent and the free magnesium control agent, and the seed material includes adding an admixture including the magnesium compound, the effective amount of the dispersing agent and the free magnesium control agent, and the seed material to wastewater within the wastewater treatment system, wherein the admixture includes a slurry including between about 0.01% to about 50% of the seed material by weight of the slurry.

19. The method of claim 1, further including adding a scale reducer to wastewater within the wastewater treatment system.

20. The method of claim 19, wherein the scale reducer includes one or more of ascorbic acid, citric acid, acetic acid, and an organic derivative of one or more of ascorbic acid, citric acid, acetic acid, and an alkyl amine acetic acid.

21. The method of claim 19, wherein adding the magnesium compound, the effective amount of the dispersing agent and the free magnesium control agent, and the scale reducer to wastewater within the wastewater treatment system includes adding a slurry including the magnesium compound, the effect amount of the dispersing agent and the free magnesium control agent, and the scale reducer, slurry including between about 0.01% to about 50% of the scale reducer by weight of the slurry.

22. A method for treating wastewater comprising:
adding a magnesium compound to wastewater within a wastewater treatment system, the wastewater treatment system including a municipal wastewater treatment system; and
adding an effective amount of a dispersing agent, the dispersing agent including one or more polymeric surfactants, and a free magnesium control agent, wherein the free magnesium control agent is selected from the group consisting of one or more of a salt of a polyamine acetic acid, an acid of a polyamine acetic acid, a gluconate, a carboxylate polymer, and a polyaspartic acid, to the wastewater within the wastewater treatment system to reduce the formation of struvite scale within the wastewater treatment system.

* * * * *